(12) United States Patent
Jouppi et al.

(10) Patent No.: US 7,643,456 B2
(45) Date of Patent: Jan. 5, 2010

(54) TRANSFER OF PACKET DATA TO WIRELESS TERMINAL

(75) Inventors: Jarkko Jouppi, Seinäjoki (FI); Janne Rinne, Tampere (FI)

(73) Assignee: Nokia Corporation, Espoo (FI)

( * ) Notice: Subject to any disclaimer, the term of this patent is extended or adjusted under 35 U.S.C. 154(b) by 424 days.

(21) Appl. No.: 10/957,777

(22) Filed: Oct. 4, 2004

(65) Prior Publication Data
US 2005/0053070 A1 Mar. 10, 2005

Related U.S. Application Data

(63) Continuation of application No. PCT/FI03/00263, filed on Apr. 8, 2003.

(30) Foreign Application Priority Data
Apr. 9, 2002 (FI) .................................. 20020677

(51) Int. Cl.
H04W 4/00 (2006.01)
(52) U.S. Cl. ...................................... 370/338; 370/349
(58) Field of Classification Search .................. None
See application file for complete search history.

(56) References Cited

U.S. PATENT DOCUMENTS

| 7,145,919 | B2 * | 12/2006 | Krishnarajah et al. ........ 370/474 |
| 2001/0027490 | A1 * | 10/2001 | Fodor et al. .................. 709/238 |
| 2002/0036983 | A1 * | 3/2002 | Widegren et al. .......... 370/230.1 |
| 2002/0062379 | A1 * | 5/2002 | Widegren et al. ........... 709/227 |
| 2002/0114305 | A1 * | 8/2002 | Oyama et al. ................ 370/338 |
| 2002/0120749 | A1 * | 8/2002 | Widegren et al. ........... 709/227 |
| 2003/0026230 | A1 * | 2/2003 | Ibanez et al. ................. 370/338 |
| 2003/0081592 | A1 * | 5/2003 | Krishnarajah et al. ....... 370/352 |
| 2003/0081607 | A1 * | 5/2003 | Kavanagh .................... 370/392 |
| 2005/0210141 | A1 * | 9/2005 | Oyama et al. ............... 709/228 |

FOREIGN PATENT DOCUMENTS

EP 0 372 716 A2 6/1990

(Continued)

OTHER PUBLICATIONS

Yavatkar et al., "RFC 2753—A Framework for Policy-based Admission Control", Jan. 2000, pp. 1.*

(Continued)

Primary Examiner—Jayanti K Patel
Assistant Examiner—Jung Park
(74) Attorney, Agent, or Firm—Perman & Green LLP (57) ABSTRACT

The invention relates to transfer of packet data from a first subsystem via a network node in a second subsystem to a terminal in the second subsystem. The method includes negotiating identifiers identifying a data flow of the first subsystem via a separate signalling element during the set-up of an application-plane logical connection of the terminal. The identifiers are transmitted from the signalling element to the network node. In the method, a filter is generated at least on the basis of the identifiers for directing the mapping of at least one data flow of the first subsystem to at least one data flow of the second subsystem. The filter is bound to at least one data flow of the second subsystem, and at least one data flow of the first subsystem is mapped to at least one data flow of the second subsystem on the basis of the filter.

13 Claims, 4 Drawing Sheets

FOREIGN PATENT DOCUMENTS

| | | |
|---|---|---|
| EP | 0 762 422 A2 | 3/1997 |
| EP | 0 802 527 A1 | 10/1997 |
| EP | 0 809 244 A2 | 11/1997 |
| EP | 0 814 419 A2 | 12/1997 |
| EP | 0 849 734 A2 | 6/1998 |
| EP | 0 853 315 A2 | 7/1998 |
| EP | 0 809 244 A3 | 12/1998 |
| EP | 0 849 734 A3 | 3/1999 |
| EP | 0 853 315 A3 | 12/1999 |
| JP | 10063562 A2 | 3/1998 |
| JP | 11039262 A2 | 2/1999 |
| WO | 42 42 992 A1 | 6/1994 |
| WO | WO 98/47080 | 10/1998 |
| WO | WO 98/58368 | 12/1998 |
| WO | WO 99/14678 | 3/1999 |
| WO | WO 99/48310 | 9/1999 |
| WO | WO 99/51031 | 10/1999 |
| WO | WO 00/02385 | 1/2000 |
| WO | WO 00/08855 | 2/2000 |
| WO | WO 00/16229 | 3/2000 |
| WO | WO 00/18054 | 3/2000 |
| WO | WO 00/24192 | 4/2000 |
| WO | WO 00/76230 A1 | 12/2000 |
| WO | WO 01/56250 A1 | 8/2001 |
| WO | WO 01/91389 A2 | 11/2001 |
| WO | WO 02/23831 A1 | 3/2002 |
| WO | WO 02/37753 A2 | 5/2002 |
| WO | WO 02/073989 A1 | 9/2002 |

OTHER PUBLICATIONS

"3$^{rd}$ Generation Partnership Project; Technical Specification Group Services and System Aspects; IP Multimedia Subsystem (IMS); Stage 2 (Release 5)", 3GPP TS 23.228 V5.3.0 (Jan. 2001), pp. 1-142.
"3rd Generation Partnership Project; Technical Specification Group Services and System Aspects; End-to-End QoS Concept and Architecture; (Release 5)", 3GPP TS 23.207 V5.2.0 (Jan. 2001), pp. 1-47.
"3rd Generation Partnership Project; Technical Specification Group Services and System Aspects; General Packet Radio Service (GPRS); Service description; Stage 2 (Release 5)",3GPP TS 23.060 V5.0.0 (Jan. 2001), pp. 1-198.
U.S. Appl. No. 09/649,215, filed Aug. 28, 2000, Lamkin.
U.S. Appl. No. 09/476,190, filed Jan. 3, 2000, Collart.
U.S. Appl. No. 09/488,345, filed Jan. 20, 2000, Collart.
U.S. Appl. No. 09/488,337, filed Jan. 20, 2000, Getsin.
U.S. Appl. No. 09/488,155, filed Jan. 20, 2000, Getsin.
U.S. Appl. No. 09/489,600, filed Jan. 20, 2000, Getsin.
U.S. Appl. No. 09/488,614, filed Jan. 20, 2000, Getsin.
U.S. Appl. No. 09/489,601, filed Jan. 20, 2000, Getsin.
U.S. Appl. No. 09/489,597, filed Jan. 20, 2000, Getsin.
U.S. Appl. No. 09/489,596, filed Jan. 20, 2000, Collart.
E Media Professional Reviews, NSM Galaxy Jukebox, by David Doering, Emedia Professional, Apr. 1999, (p. 78-80), http://www.emediapro.com/EM1999/doering4.html.
"Interactive Education: Transitioning CD-ROMs to the Web", by Michael Mascha and Gary Seaman, Department of Anthropology, University of Southern California, Los Angeles, California, USA, Computer Networks and ISDN Systems 27 (1994) 267-272.
"Active Video Watching Using Annotation," by Nuno Correia and Teresa Chambel, ACM Digital Library, International Multimedia Conference, Oct. 30-Nov. 5, 1999, in Orlando, Florida.
"No Modem Needed: TV Signals Bring the Web to Your PC," by Michael S. Lasky, Computing Storypage, CNN IDG.net, May 19, 1998.
"All About DIVX, Where the Facts are Told and the Decision is Yours!" Webmaster's Note Jan. 26, 1999, http://www.prodivx.com.
Advanced Television Enhancement Forum Specification (ATVEF), Comment Draft Version 1.0r1, 1-20 printout from web site Http://www.atvef.com/atvef_spec/TVE-public.htm (Oct. 18, 1998).
MBone Multicasting Tomorrow's Internet, Request for Comments (RFC) 1112 and 1458, Appendices A and B, Copyright 1996, 1998.
Abstract of "MBone Provides Audio and Video Across the Internet," M. R. Macedonia and D. P. Brutzman, IEEE Computer, vol. 27, No. 4, pp. 30-36 (Apr. 1994).
Family Tree Maker Announces 5.0 Patch, by Rick Roberts, The Global Gazette, http://globalgazette.net/gaztec/gaztec15.htm, posted Sep. 7, 1998, vol. II, No. 13.
"When Signed, Sealed, Delivered, It's Yours," by Precision Marketing, p. 30(1), Jul. 21, 1997.
http://www.spinware.net/portanet/portanet.html, printed on Jan. 8, 2003.
Abstract of Edgar Weippl's, "An Approach to Role-Based Access Control for Digital Content," 2001, IEEE, pp. 290-294.
Henry M. Gladney, "Safeguarding Digital Library Contents and Users: Document Access Control," Dlib Magazine, http://www.dlib.org/dlib/june97/ibm/06gladdney.html, Jun. 1997.
"All power to the Web; CD-ROM is dead—or is it?" by Richard Reisman, President, Teleshuttle Corporation, Jan. 1996 Teleshuttle white paper on Distributed Media, http://www.teleshuttle.com/tsdistrib.htm.
"CyberMedia Secures Major Licensing Agreement With Sony for Oil Change Software," http://www.cypbermedia.com/company/pr/sony.html, Nov. 26, 2001.
MarketScape's WebCD Pro Publisher, Ron Gustavson, Emedia Professional, Dec. 1997, http://www.emedialive.com/awards/award11.html.
"Hybrid CD-ROM/Online Titles Will Surge in 1996," DCD Business, Apr. 1996, http://www.tapediscbusiness.com/issues/1996/0496/apr_index.html.
PC Magazine, "Trends Online: Intel's Internet Plans: Hybrid Applications", Jul. 24, 1996.
"Internet tool triggers audio CDs," by Cate C. Corcoran, Jul. 24, 1995, http://www.access.ch/power/infoservices/MacWeek/MacWeek240795.html.
"MarketScape(R) WebCD(TM) 1.0 Bypasses Internet Bottlenecks," DialogWeb, Aug. 26, 1996.
"Microsoft Expands Benefits for Site Builder Network Members," Microsoft Press Releases, San Jose, CA, Oct. 29, 1996, http://www.spindia.com/trisoftdesign/Press/SBN/SBNtwkpr.htm.
"CD-ROM/Online Hybrids, The Missing Link?", by Richard R. Reisman, CD-ROM Professional, vol. 8, No, 4, Apr. 1995, http://www.teleshuttle.com/cdpart.htm.
Netstuff postings; Sep. 2-Sep. 6, 1996, Aug. 26-Aug. 30, 1996, Aug. 19-Aug. 23, 1996, Aug. 12-Aug. 16, 1996, edited by James Careless with files from the Newsbytes News Network, http://www.monitor.ca/monitor/issues/vol4iss1/netstuff.html.
"Oil Change software hunts down upgrades," by Bary Cooper, The Orlando Sentinel, Web-Posted Oct. 30, 1996, The Augusta Chronicle Online, http://www.augustachronicle.com/headlines/103196/oil_change.html.
Player 2.0 Product Description, Copyright 1995-2000, InterActual Technologies.
Resource Guide on Distributed Media: Local/CD-ROM/Online/Web, updated Nov. 25, 1996, Richard R. Reisman, President, Teleshuttle, http://www.teleshuttle.com/resource.
"Topic is Veritably Everywhere: CD-ROM, the Web, Intranets, etc.," Seybold Report on Desktop Publishing, vol. 10, No. 7, Copyright 1996 by Seybold Publications Inc.
"Spin Webs around a CD-ROM: The Next Generation of CD/Web Hybrids," Richard R. Reisman, President, Teleshuttle Corporation, Mass High Tech, Sep. 12, 1996, http://www.teleshuttle.com/nextgen.htm.
"Update Your Software While You Sleep," Edited by Paul M. Eng, Bits & Bytes, BusinessWeek, Updated Jun. 17, 1996, http://www.businessweek.com/1996/25/b3480140.htm
"Verity smooths Net searches," by CNET News.com Staff, Tech News—CNET.com, Feb. 20, 1996.
"Video and Audio: Organization and Retrieval in the WWW", White Paper. (1996) http://vosaic.com/corp/papers/www5.html. Http://citeseer.nj.nec.com/chen96video.html.
"Web/CD-ROM hybrids; A working definition," site established Oct. 2, 1998, http://www.philb.com/webcd.htm.
Who's Who Hybrid Internet/CD-ROM Magazine/Catalog, Google cache Nov. 26, 2001, http://www.ecatcorp.com/alpha/mci.htm.

WebCD, Internet Posting, Roger Clarke, Dec. 1, 1996, http://www.anu.edu.au/people/Roger.Clarke/II/WebCD.html.

Re: WebCD, Internet Postings, George Michaelson, Dec. 1, 1996, http://www.anu.edu.au/mail-archives/link/link9612/0003.html and Dec. 2, 1996, http://www.anu.edu.au/mall-archlves/link/link9612/0011.html.

Re: WebCD, Internet Posting, Liddy Nevile, Dec. 2, 1996, http://www.anu.edu.au/mail-archives/link/link9612/0010/html.

Re: WebCD, Internet Posting, Rachel Polanskis, Dec. 2, 1996, http://www.anu.edu.au/mail-archives/link/link9612/0013.html.

www.techdirt.com/articles/20030516/1358202.shtml, May 16, 2003.

www.techdirt.com/articles/990616/1020235_F.shtml, Jun. 16, 2003.

"MultiSync: A Synchronization Model for Multimedia Systems," IEEE Journal On Selected Areas in Communications, vol. 14, No. 1, Jan. 1996, pp. 238-248.

"World-Wide Web: a distributed paradigm for global hetworking"; Heylighen, F., Proceeding SHARE Europe Spring Conference; pp. 355-368; Apr. 18, 1994.

"A Simplified and an Efficient Packet Level Internet Access Control Scheme"; Igbal, MS, et al.; ICCS/ISITA '92; Singapore; IEEE Publications; 1992; pp. 963-967.

"CDLink", Duguid, Brian; The Wire, Apr. 1996, available at http://www.hyperreal.org/~duguid/wirecdlk/html.

"CDLink: Multimedia Liner Notes to Complement Your Music Collection", Mirapaul, Matthew; N.Y. Times (online ed.); Jan. 25, 1996; available at http://is.gseis.ucla.edu/impact/w96/News/News3/0125mirapaul.html.

"Voyager CDLink Turns Audio CDs into CD-ROMs"; Press Release, Voyager Co.; (Jul. 12, 1995), available at http://www.voyagerco.com from Jul. 12, 1995 to 1997.

"Net Surf", Wired Magazine, Issue 4.05 (May 1996), available at http://www.wired.com/wired/archive/4.05/net_surf.html.

"Voyager CDLInk (VCD) Control Language Reference", available at http:web.archive.org/web/19970213172801/www.voyagerco.com/cdlink/about/vcd_ref/cmdref.html, originally available at http:www.voyagerco.com/cdlink/about/vcd_ref/cmdref.html on Aug. 8, 1995.

"Labels Link CDs, Web Sites Via CDLink", Marilyn A. Gillen, Billboard, Jul. 22, 1995, at 58.

HyperLOCK Technologies at a Trade Show at the Jacob K. Javits Convention Center, New York, New York, taken Aug. 1, 1996.

"Hybrid 'Net: CD-ROMs & the Web working in tandem"; Rosebush, et al.; www.netscapeworld.com/netscapeworld/nw-08-1996/nw-08-hybridcd.html; published Aug. 15, 1996.

"Going Hybrid: The Online CD-ROM Connection"; Stansberry; Newmedia, Jun. 1995, pp. 34-40.

"CD-ROM and Web browsers: HTML as the Lingua Franca", CD-ROM Professional, Aug. 1996, vol. 9, No. 8 at p. 26.

Standard ECMA-130, "Data interchange on read-only 120 mm optical data disks (CD-ROM)", 2nd Edition, Jun. 1996.

"Relative Uniform Resource Locators", Fielding, Jun. 1995, available at http://www.w3.org/Addressing/rfc1808.txt.

"A Beginners Guide to URLs", available at http://archive.ncsa.uiuc.edu/demoweb/uri-primer.html.

"Naming and Addressing: URIs, URLs, . . ." Printed Mar. 17, 2004. available at http://www.w3.org/Addressing/.

Sastry, Chellury R. et al., "Webtour: A System to Record and Playback Dynamic Multimedia Annotations on Web Document Content" Proceedings of the seventh ACM international conference on Multimedia; Oct. 1999, pp. 175-178.

Nkane, et al., Development of combined HDD and recordable-DVD video recorder, consumer Electronics, 2002, IEEE, 2002 Digest of Technical Papers, International Conference on Jun. 18-20, 2002, pp. 264-265.

"Software Distribution by CD-ROM Linked with Network," IBM Technical Dislcosure Bulletin, vol. 38, No. 11, Nov. 1, 1995, pp. 111-112.

Re: WebCD, Internet Posting, Ron Ipsen, Dec. 1, 1996, http://www.anu.edu.au/mail-archives/link/link9612/0006.html.

* cited by examiner

TRANSFER OF PACKET DATA TO WIRELESS TERMINAL

This application is a continuation of international application number PCT/FI03/00263 filed Apr. 8, 2003, status pending, and which claims priority to Finnish Patent Application 20020677 filed Apr. 9, 2002.

BACKGROUND OF THE INVENTION

The invention relates to the transfer of packet-switched data to a wireless terminal.

PDP contexts (Packet Data Protocol) are used in the transfer of user data in GPRS services (General Packet Radio Service) and in packet-switched services of the UMTS system (Universal Mobile Telecommunications System). PDP contexts are generally logical connections, on which IP data are transferred from a mobile station to a boundary node (GGSN) in a UMTS network and vice versa. For the mobile station, a PDP address (at least one) is specified, for which several PDP contexts can be opened in the UMTS system. The first context is called a primary PDP context and the next PDP contexts are secondary PDP contexts.

The mobile station knows which application data flows are to be directed to which links of a PDP context in uplink data transfer. In downlink, the gateway GPRS support node should also know packet-specifically which PDP context is used for each data flow received from an external IP network. For this purpose, the destination IP address of the packet is used; TFT templates (Traffic Flow Templates) are also specified in the UMTS. The idea of TFT templates is that the mobile station sends given TCP/UDP/IP header field values to the gateway GPRS support node GGSN for identification of the data flow. A TFT contains one or more so-called packet filters. These packet filters can be used particularly for QoS (Quality of Service) mapping, i.e. mapping received packets into a data flow offering a quality of service according to the QoS information, e.g. the DiffServ field (Differentiated Services), in the UMTS system.

In addition, an IP multimedia subsystem IMS is designed in the UMTS system for providing various IP multimedia services to UMTS mobile stations (UE; User Equipment). The IMS utilizes packet-switched UMTS services, PDP contexts, for data transfer to or from a mobile station. The IMS includes functions that enable negotiation of an end-to-end session on the application plane using the SIP protocol (Session Initiation Protocol), the features of the session being for instance the codecs used, the termination points and the quality of service (QoS). For arranging the agreed end-to-end quality of service also in a UMTS network, the IMS includes a call session control function (CSCF), which includes a PCF function (Policy Control Function) for authorizing quality of service resources (bandwidth, delay, etc.) for an IMS session based on SIP-layer SDP information (Session Description Protocol). For binding the authorization decision, an authorization token is determined in the PDP context, which the PCF creates for each session and which is transmitted from the CSCF to the mobile station. When the PDP context is being activated, the mobile station sends, to the gateway GPRS support node GGSN, an authorization token and a flow identifier that constitute binding information. The flow identifier identifies the IP media flow associated with the SIP session. The GGSN comprises a PEP function (Policy Enforcement Point) that controls the offering of the quality of service resources to the data flow according to the authorization token received from the PCF. The GGSN requests authorization for allocating resources to the session indicated by the binding information from the PCF, which is located at the P-CSCF (Proxy CSCF). The PCF functionality makes a final decision on resource allocation to the session and responds to the GGSN. The PEP function of the GGSN generates, based on this, a logical 'gate' for implementing admission control according to the decision of the PCF for a unidirectional data flow. A source IP address, destination IP address, source gate, destination gate and protocol may be used as packet classification parameters.

Figure 1:
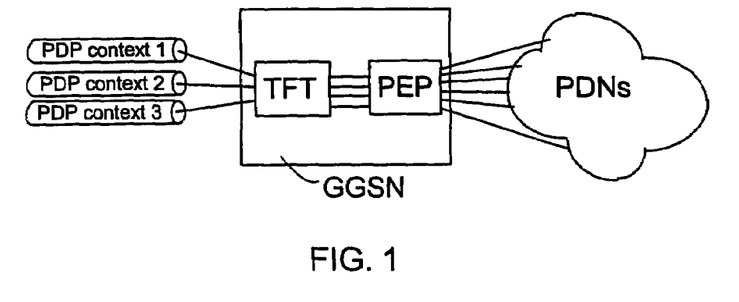
FIG. 1 illustrates filtering and mapping of downlink packets into PDP contexts.

A problem in the above arrangement is that the GGSN performs similar downlink packet filtering by means of the gate functionality provided both by the TFT templates and by the PEP functionality. If the packets pass through the gate, a PDP context is selected for them by means of the TFT functionality, as illustrated in FIG. 1. Problems arise if these filters do not match, in which case the packets do not end up in the right PDP contexts.

BRIEF DESCRIPTION OF THE INVENTION

The object of the invention is thus to provide a method and equipment for implementing the method so as to avoid the above drawback. The objects of the invention are achieved by a method, a network element and a wireless terminal, which are characterized by what is stated in the independent claims. The preferred embodiments are disclosed in the dependent claims.

The invention comprises negotiating at least identifiers identifying a data flow of the first subsystem via a separate signalling element during the set-up of an application-plane logical connection of the terminal. One or more of the identifiers are transmitted from the signalling element of the first subsystem to a network node transmitting data to the second subsystem. In the system, a filter is generated on the basis of at least the identifiers received at the network node for directing the mapping of at least one data flow of the first subsystem to at least one-data flow of the second subsystem. The filter, generated based on at least the identifiers received from the signalling element, is bound to at least one data flow of the second subsystem, and at least one data flow of the first subsystem is mapped to at least one data flow of the second subsystem based on the filter.

This avoids a separate transfer of filter parameters within the second subsystem, and the packets passing through the filtering specified based on local or end-to-end identifiers negotiated on the application plane can be connected to the correct data flow of the second subsystem. For example, in a UMTS system supporting the IMS system, a packet can be transferred directly to a PDP context, and two filter functionalities are thus not required.

In accordance with a preferred embodiment of the invention, a UMTS system utilizing TFT information elements is concerned, whereby an identifier identifying the PDP context is transferred to a gateway GPRS support node PEP function constituting a gate formed by application-plane identifiers, wherein the identifier is associated with at least one filter. The PEP function may map the data flow fulfilling the filter parameters to a PDP context identified by the identifier, whereby the TFT filter is not needed at the gateway GPRS support node. In this case, the processing of TFT information elements in the mobile station can also be avoided, which reduces the functionality and resources required of the mobile station.

BRIEF DESCRIPTION OF THE FIGURES

In the following, preferred embodiments of the invention will be described in detail with reference to the accompanying drawings, in which.

DETAILED DESCRIPTION OF THE INVENTION

The method of a preferred embodiment of the invention is described next in conjunction with an exemplary UMTS system. However, the invention is applicable to any packet-switched telecommunication system wherein data flows need to be mapped. The method of the invention is applicable to e.g. a second generation GPRS service (General Packet Radio Service).

Figure 2:
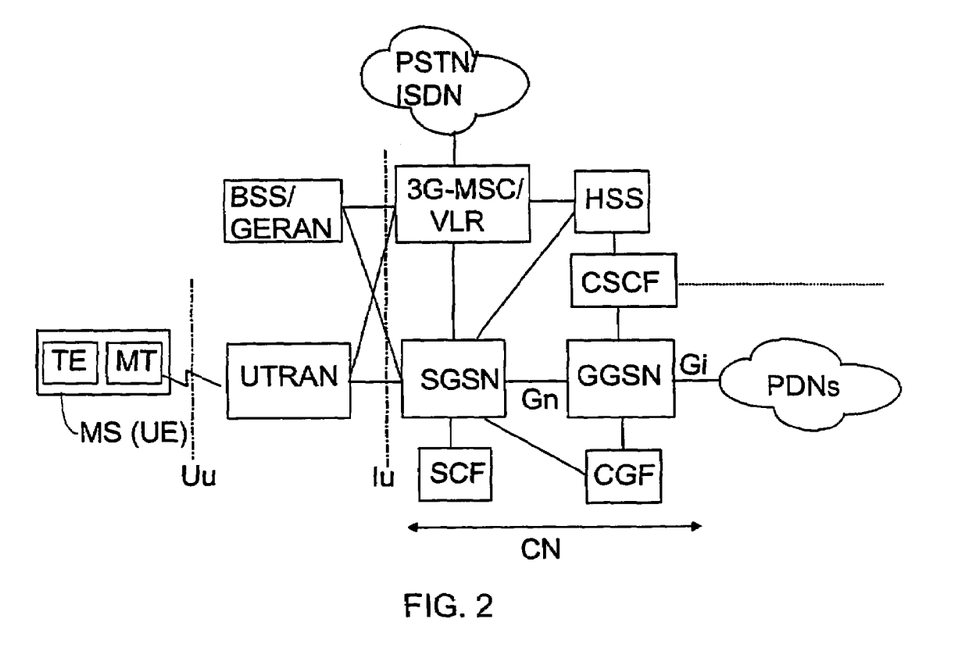
FIG. 2 generally illustrates a UMTS system.

Reference is made to FIG. 2, wherein the main parts of a mobile system include a core network CN and a UMTS terrestrial radio access network UTRAN, which constitute the fixed network of the mobile system, and a mobile station MS, also called user equipment UE. The interface between the CN and the UTRAN is called Iu, and the air interface between the UTRAN and the MS is called Uu.

The UTRAN is typically composed of several radio network subsystems RNS, the interface between which is called Iur (not shown). The RNS is composed of a radio network controller RNC and one or more base stations BS, for which the term node B is also used. The interface between the RNC and the BS is called Iub. The base station BS attends to implementing the radio path and the radio network controller RNC manages radio resources. A connection to the UMTS core network CN can also be set up via a GSM base station subsystem BSS or a GSM/EDGE radio access network (Enhanced Data rates for GSM Evolution) GERAN.

The core network CN is composed of an infrastructure of a mobile system external to the UTRAN. In the core network, a mobile services switching centre/visitor location register 3G-MSC/VLR attends to circuit-switched calls and communicates with a home subscriber server HSS. The connection to the serving GPRS support node SGSN of a packet radio system is set up via an interface Gs' and to the fixed telephone network PSTN/ISDN via a gateway MSC GMSC (not shown). The connection of both the mobile services switching centre 3G-MSC/VLR and the serving GPRS support node SGSN to the radio network UTRAN (UMTS Terrestrial Radio Access Network) is set up via the interface Iu.

The UMTS system thus also comprises a packet radio system, which is largely implemented in accordance with a GPRS system connected to a GSM network, which also accounts for the references to the GPRS system in the network element names. The packet radio system of the UMTS may comprise several gateway GPRS support nodes and serving GPRS support nodes, and typically several serving GPRS support nodes SGSN are connected to one gateway GPRS support node GGSN. The task of the serving GPRS support node SGSN is to detect mobile stations capable of packet radio connections within its service area, to transmit and receive data packets from said mobile stations and to monitor the location of the mobile stations within its service area. Furthermore, the serving GPRS support node SGSN communicates with the home subscriber server HSS via the interface Gr. Records including the content of subscriber-specific packet data protocols are also stored in the home subscriber server HSS. The HSS includes e.g. information on the PDP contexts allowed to a subscriber and information for the use of services provided by the IMS.

The gateway GPRS support node GGSN operates as a gateway between the packet radio system of the UMTS network and an external packet data network PDN. External data networks include for instance the UMTS or GPRS network of another network operator, the Internet or a private local area network. The gateway GPRS support node GGSN communicates with said data networks via an interface Gi. The data packets transferred between the gateway GPRS support node GGSN and the serving GPRS support node SGSN are always encapsulated in accordance with a gateway tunnelling protocol GTP. The gateway GPRS support node GGSN also comprises the addresses of PDP contexts (Packet Data Protocol) activated for the mobile stations and the routing information, i.e. for instance the SGSN addresses. Routing information is thus used for linking data packets between an external data network and the serving GPRS support node SGSN. The network between the gateway GPRS support node GGSN and the serving GPRS support node SGSN is a network utilizing the IP communication protocol. A packet data system may also comprise many other functions, of which FIG. 2 shows a control function SCF for intelligent network services, preferably CAMEL services, and a charging gateway CGF attending to charging.

Of the elements of the IMS system, FIG. 2 also illustrates a call session control function CSCF, which may have three different roles: Proxy-CSCF (P-CSCF), which comprises a PCF function and transfers SIP messages to other SIP network elements; Interrogating-CSCF (I-CSCF), which is a subscriber home network contact point, allocates the serving CSCF (S-CSCF) and forwards SIP requests to the S-CSCF; S-CSCF, which is a CSCF controlling the end-to-end session of a mobile station. For a more detailed description of the IMS system, reference is made to 3GPP specification 3GPP TS 23.228, v.5.3.0 (January 2002), 'IP Multimedia Subsystem (IMS); Stage 2; Release 5'.

Figure 3:
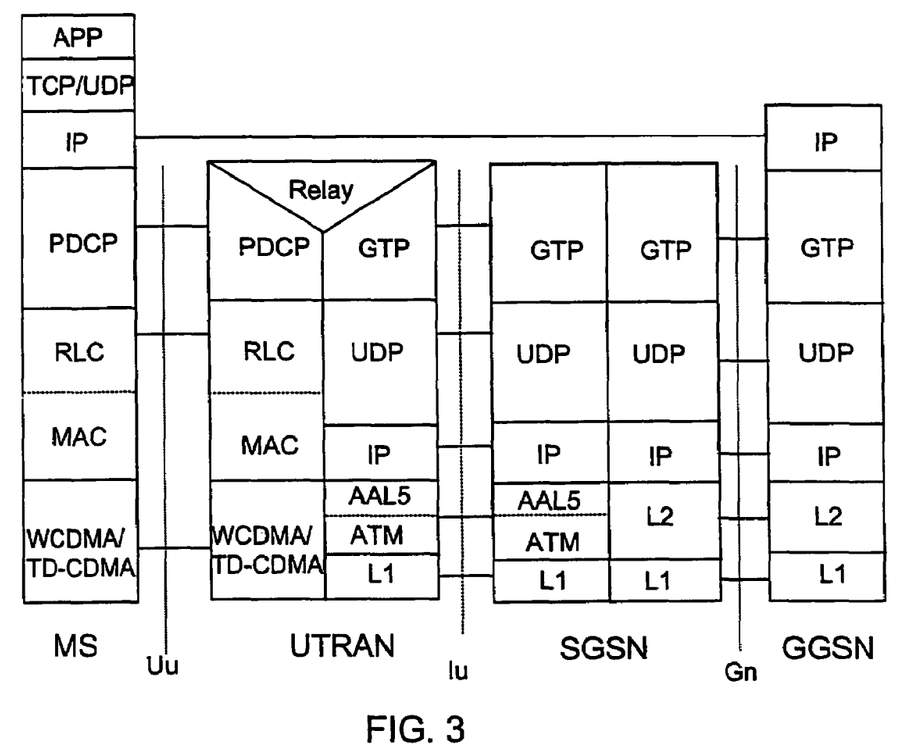
FIG. 3 shows UMTS user-plane protocol architecture.

The UMTS packet data protocol architecture is divided into a user plane and control plane. The control plane comprises UMTS-specific signalling protocols. FIG. 3 illustrates the user plane, which delivers user data in protocol data units (PDU) between a mobile station and a GGSN. At the interface Uu between the radio network UTRAN and a mobile station MS, lower-level data transfer at the physical layer L1 takes place in accordance with the WCDMA or the TD-CDMA protocol. The MAC layer, on top of the physical layer, transfers data packets between the physical layer and the RLC layer (Radio Link Control), and the RLC layer attends to the management of the radio links of different logical connections. The functionalities of the RLC comprise for instance the segmentation of data to be transmitted into one or more RLC data packets. It is possible to compress the header fields comprised by the data packets of the PDCP layer (PDCP-PDU) on top of the RLC. The data packets are segmented and then transferred in RLC frames, to which address and checking information, vital to data transfer, is added. The RLC layer offers the capability of quality of service QoS definition to the PDCP layer and attends also to the retransmission of damaged frames in acknowledged transfer mode (other modes are transparent transfer and unacknowledged transfer), i.e. performs error correction. The PDCP, RLC and MAC constitute a transfer link layer. The serving GPRS support node SGSN attends to the routing of data packets incoming via the radio network RAN from the mobile station MS further to the correct gateway GPRS support node GGSN. This connection employs the tunnelling protocol GTP, which encapsulates and tunnels all user data and signalling forwarded via the core network. The GTP protocol is run over the IP employed by the core network. The IP protocol can be used in a UMTS network for two different purposes. The upper IP layer is a so-called application layer IP, which is used between the MS and the GGSN and to a peer device in an external IP network. The TCP or UDP protocols, utilized by applications APP, can be executed on top of the upper IP layer. The application layer APP also has a SIP functionality, which is able to communicate with the CSCF. It is to be noted that applications APP and the upper IP stack can be located in a separate data terminal (TE; Terminal Equipment), a separate mobile terminal part MT acting as the communication device to the UMTS network. An example of this kind of a wireless terminal is a combination of a portable computer and a UMTS card phone.

To obtain packet-switched services, a mobile station MS has to perform an attach procedure, making the location of the MS known at the serving GPRS support node SGSN. The MS is then able to receive short messages and calls from the serving GPRS support node SGSN. To receive and transmit packet-switched data, the MS has to activate at least one PDP context that makes the MS known at the gateway GPRS support node GGSN and creates a logical data transfer context at the mobile station MS, the serving GPRS support node SGSN and the gateway GPRS support node GGSN. When the PDP context is being created, a PDP address, which could be an IPv4 or IPv6 address (when PDP type is IP), is defined for the MS. The PDP address is defined, in addition to other PDP context data, such as the negotiated QoS profile, in a context table maintained by the GGSN.

To implement a service-based local policy, the GGSN comprises a PEP function (Policy Enforcement Point) that controls the offering of quality of service resources to the data flow according to the authorization received from the PCF. The gating functionality offered by the PEP thus tends to identify a given flow or a group of flows by including information about possible header fields in the form of a set of packet filter parameters, i.e. packet filters PF.

Figure 4:
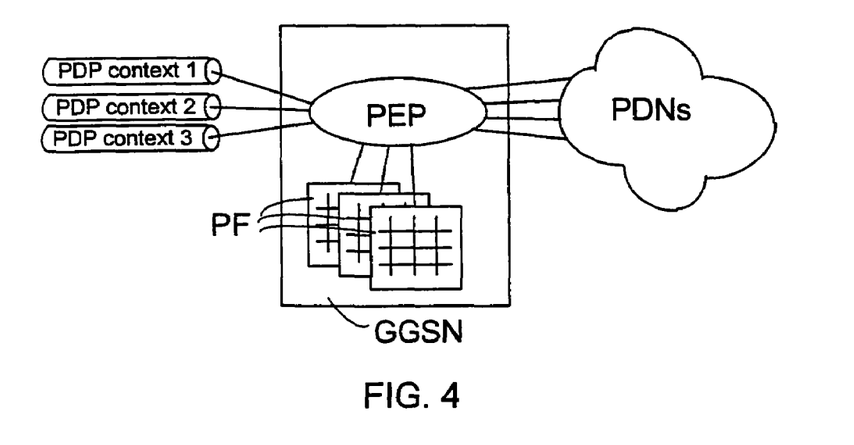
FIG. 4 illustrates a gateway GPRS support node GGSN comprising the filter and mapping functionality according to a preferred embodiment of the invention.

As FIG. 4 illustrates, in accordance with a preferred embodiment, the PEP is arranged to directly map the data flows received from external networks PDN into the correct PDP contexts. In the packet filters PF, one or more of five packet classification parameters specified for the gating functionality in the 3GPP specifications, any filter parameters usable when applying TFT information elements (source IP address (referring to the address of the peer device in the external network PDN), source gate, destination gate, Diff-Serv field (Differentiated Services), flow identifier (IPv6), protocol number (IPv4)/the following header field (IPv6), security parameter index SPI in association with the IPSec protocol), combinations of the above, or any other identifier identifying the data flow end-to-end or negotiated locally (for example by the MS in a UMTS network), may be used. The system may employ a proxy functionality, whereby a filter parameter does not identify the identifier of the data flow end-to-end, but the address of the GGSN element instead of the address of the mobile station MS, for example. The packet filter PF may be completely defined when establishing the logical application-plane connection for the data flow from identifying identifiers at the P-CSCF element (PCF function), and transferred to the GGSN (PEP function). The PEP function determines a gate defined by the packet filter PF for the data flow, which it binds to at least one PDP context based on the PDP address, for example. Packet filters PF are typically PDP context-specific, whereby each packet filter PF (for a given data flow) is bound to one PDP context. In this case, TFT information elements and the TFT filtering performed based thereon at the GGSN are not needed at all, since the PEP is able to map the downlink packets 'passing through the gate', i.e. according to the filter parameters, into the correct PDP context. This provides significant advantages, since all drawbacks caused by double filtering are avoided: errors caused by deviating filter parameters, the functionality required for using TFT information elements, both at the mobile station MS and at the gateway GPRS support node GGSN.

If secondary PDP contexts are to be used, binding data are transferred instead of a TFT information element from the mobile station MS during activation. In order for the GGSN to be able to distinguish secondary PDP contexts from (primary and secondary) PDP contexts comprising the same PDP address, it has to bind the packet filter PF individually to the identifier identifying the secondary PDP context. In accordance with an embodiment, this identifier is the TEID (Tunnel-End-Point Identifier). The TEID identifier is used in tunnelling user data between the SGSN and the GGSN. Another alternative is the NSAPI identifier (Network Service Access Point), which the mobile station MS selects and transmits in a secondary PDP context activation request. These identifiers can naturally also be used to bind primary PDP contexts to a given packet filter PF in the PEP function.

In accordance with a preferred embodiment, the mobile station MS, however, still transmits a TFT information element in secondary PDP context activation or modification messages, but does not include any filter information therein. The filter information used at the GGSN is determined based on the identifiers of the data flows negotiated on the application plane and obtained from the PCF function, and TFT filtering is not used at the GGSN. This embodiment provides the advantage that the serving GPRS support node SGSN does not have to be changed, but it can operate as is defined in the 3GPP specifications, and accept the secondary PDP context activation requests included in the TFT information element. In this case, the IMS binding information, i.e. authorization token and flow identifiers, can also be transferred from the mobile station MS to the GGSN using the TFT information element and thus indicate the secondary PDP context to which the data flow determined by the packet filter of the gate is to be bound.

Partial use of the filter parameters of the TFT information element is also feasible, allowing the mobile station MS to add one or more filter parameters, which the PEP function of the GGSN is to use as the packet filter, to the TFT information element. An example of this is that the MS allocates to itself a new interface identifier to its IPv6 address suffix when IPv6 addresses are used. In this case, the MS indicates, in a PDP context activation or modification message at the TFT information element, a new interface identifier for the GGSN, which the GGSN sets as the new filter parameter in addition to the filter parameters indicated by the PCF. Thus, in this embodiment, filter parameters determined by both the PCF and the MS can be used, however, the actual filtering takes place preferably only once performed by the PEP function, and TFT filtering is not required.

In accordance with still another embodiment, TFT filtering is also used at the GGSN in addition to PEP function filtering. In this case, the procedure is as illustrated in FIG. 1; however, with the exception that the GGSN copies the filter parameters used by the gate functionality into filter parameters used by the TFT filter. This embodiment avoids problems caused by different filter parameters, but the GGSN still performs two filterings on the packets. This embodiment can be further advanced by arranging the TFT filter functionality to filter the packets in accordance with packet filter parameters obtained from the PEP function (and possibly from the TFT information element) and to link the packets to the PDP context (primary or secondary) associated with the packet filter. In this case, no filter functionality at all is required in the PEP function. However, an embodiment is illustrated in detail below, wherein the PEP function performs the filtering.

Figure 5:
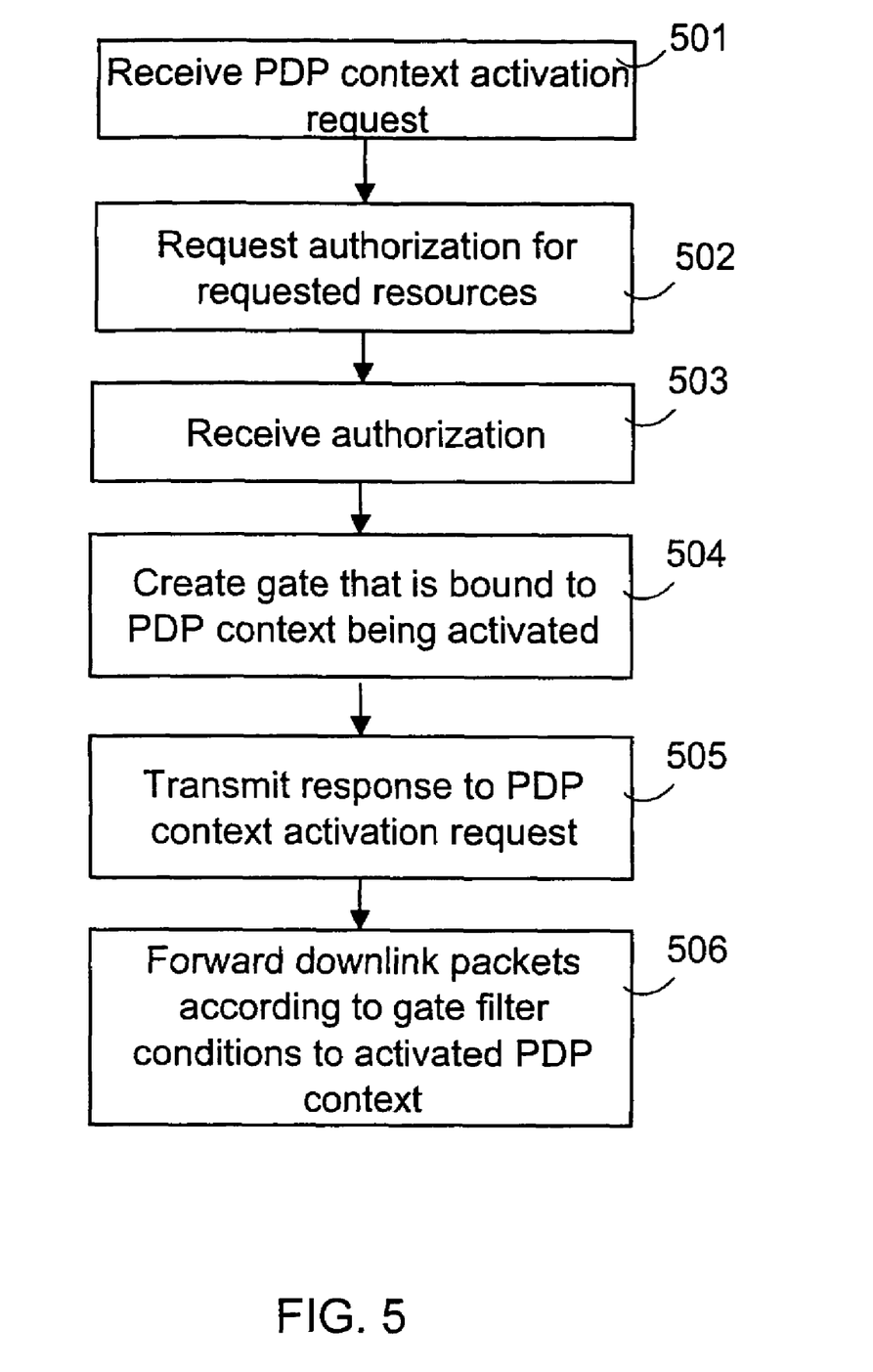
FIG. 5 is a flow diagram of the function of a gateway node according to a preferred embodiment of the invention.

FIG. 5 illustrates the operation of a gateway GPRS support node GGSN according to an embodiment, wherein a packet classifier obtained from the PCF function of the P-CSCF is used as packet filters PF. In step 501, the GGSN receives a request to activate the PDP context. The request includes binding information obtained by the mobile station from the P-CSCF, i.e. one or more flow identifiers and an authorization token, based on which the GGSN finds out the correct CSCF element (which thus plays the role of the P-CSCF and comprises the PCF functionality).

The GGSN transmits 502 a request to authorize the required resources to the PCF functionality of the P-CSCF indicated by the authorization token. The PCF makes a decision to allocate the resources by specifying a packet classifier, and the GGSN receives 503 a response including the packet classifier. The response includes the packet classification parameters determined by the PCF, which are defined from data flow identifiers negotiated on the application plane. If the resources can be reserved, the GGSN (PEP function) generates 504 a logical gate, which uses the packet classification parameters determined by the PCF as its packet filter parameters for one or more PDP contexts. The gate is thus bound to at least one PDP context based on the PDP address. The gate is bound for instance by determining, for each gate-specific packet classifier, a PDP context identifier, to which the gate determined by the packet classifier, and thus the data flow passing through the gate, are bound.

If secondary PDP contexts are used, an identifier that distinguishes a secondary PDP context from other PDP contexts including the same PDP address is to be used in the binding information of the gate determined by the packet filter in the PEP function, in addition to (or instead of) the PDP address. This identifier may be NSAPI or TEID, for example. In gate generation step 504, the GGSN is arranged to associate the identifier uniquely identifying the PDP context with the packet filter PF.

The GGSN typically still replies to the PCF. If the PCF allows resource allocation, the GGSN can establish the PDP context in accordance with the request 501. In this case, the PDP context is established using the quality of service adapted by the UMTS network from the quality of service parameters of the IP plane or application plane of the mobile station MS (unless the SGSN or the GGSN has had to restrict the requested quality because of subscriber data or its own resource limitations, for example). For a more detailed description of the activation, modification or release of a PDP context, reference is also made to 3GPP specification 3GPP TS 23.060 V5.0.0 'General Packet Radio Service (GPRS); Service Description; Stage 2; Release 5', January 2002, paragraph 9, pages 119 to 140.

The GGSN is then able to transfer 506 received downlink packets fulfilling the filter conditions defined for the gate to the mobile station using a PDP context that is bound to the gate. When a packet is received from an external packet data network, its header fields are checked. When doing this, the GGSN compares the header fields of the packets received from the external IP network PDN with the filter conditions (PF) of the gates, based on which the GGSN knows if the packets can be forwarded to the terminal, and, if so, which PDP context is to be applied to each IP packet. If a gate is found, whose filter conditions the packet corresponds to, i.e. the header fields of the packet correspond to the set of packet classification parameters (packet classifier) determined by the PCF at the GGSN (PEP function), the PEP determines the identifier of the PDP context associated with the gate and directs the packet to be transferred in accordance with the PDP context and the UMTS network quality of service reservations defined therein. If the packet identifiers do not conform to the filter conditions bound to the PDP context, the packet cannot be transferred by means of the PDP context.

The functions of the gateway GPRS support node illustrated in FIG. 5 can also be utilized when the MS requests for modification of the PDP context, i.e. changing an existing PDP context to conform to the needs of a new application, for example. In this case, in step 504, the GGSN generates a gate that is bound to an active PDP context. The GGSN does not create a new PDP context, but only modifies an activated PDP context in accordance with the request 501. It is also feasible that the binding information and packet filter sent by the PCF functionality are found in an intermediate memory maintained by the gateway GPRS support node GGSN, if data has been retrieved previously using the binding information. Furthermore, it is possible that the PEP functionality of the GGSN does not have to separately request (Pull) authorization and binding information from the PCF, but the PCF may also give them automatically to the GGSN (Push) before the need arises.

Figure 6:
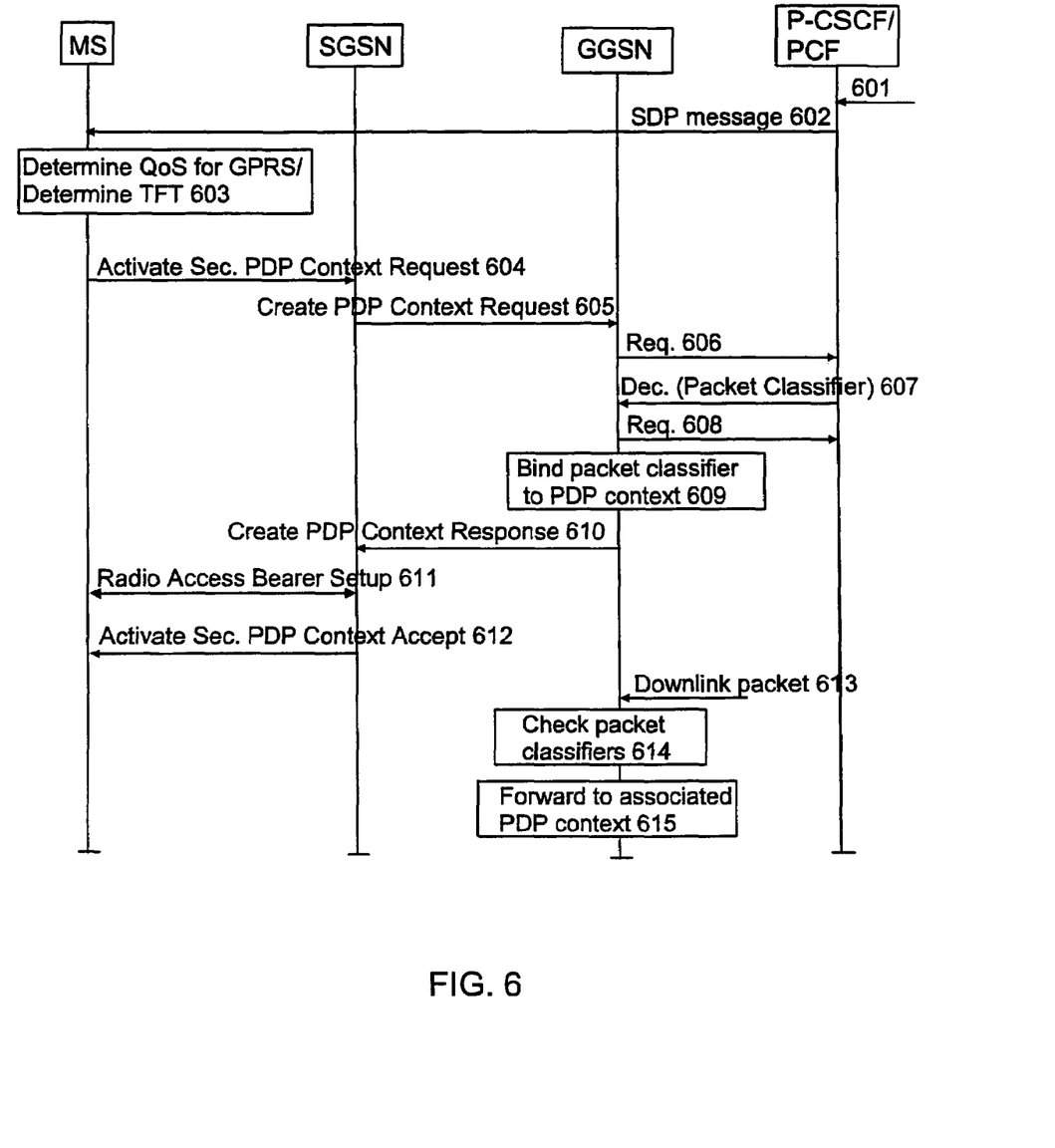
FIG. 6 shows the activation of a secondary PDP context.

FIG. 6 shows a signalling diagram illustrating in more detail the activation of a secondary PDP context when applying a service-based local policy in accordance with a preferred embodiment of the invention. The P-CSCF receives 601 a SDP message including the necessary information about the application-plane session to be set up, such as termination points and bandwidth requirement. The message 601 may originate for instance from another CSCF element (S-CSCF) because of an IMS session invite request from another party to the application-plane logical connection or the mobile station MS. The PCF function authorizes the quality of service resources (bandwidth, delay, etc.) for the IMS session based on the SDP information. The PCF creates an authorization token for the session and sends 602 the authorization token to the mobile station MS. As regards a more detailed description of the communication between the P-CSCF (PCF) and the mobile station MS, reference is made to 3GPP specification 3GPP TS 23.207, v. 5.2.0, 'End-to-End QoS Concept and Architecture; Release 5'.

The mobile station MS adapts 603 the application-plane (or IP-plane) quality of service requirements to the GPRS quality of service, i.e. specifies the QoS parameters to be requested for the PDP context. When the PDP context is activated, the mobile station sends 604, to the gateway GPRS support node GGSN, an activate PDP context request including not only conventional data of a secondary PDP context request but also an authorization token and a flow identifier.

In step 603, the MS generates, and in this embodiment, sends, in message 604, also a TFT information element, which, however, in this embodiment, does not include any filter parameters. The MS is thus arranged to generate the TFT information element without filter parameters when the setup of a session utilizing the IMS system P-CSCF element is concerned. Consequently, the MS is arranged to check if a separate network element, i.e. the P-CSCF (PCF function) determines the packet filter used for mapping the data flows in the network node. The check may be easily carried out in step 603 based on information received 602 from the CSCF, the information indicating if a PDP context to be activated for a service-based local protocol is concerned. The PCF may also send separate information indicating that only a packet filter PF determined by itself is to be used. If, based on the check, the filter to be used for mapping the data flows is determined in the PCF function, then the MS generates the configuration message without filter information. In this case, the MS generates the TFT information element, which preferably comprises binding information, i.e. a flow identifier and an authorization token, allowing the P-CSCF and the service-specific local protocol to be identified at the GGSN. The MS allocates, to the secondary PDP context, an identifying identifier, e.g. the NSAPI identifier, which is part of the secondary PDP context activation request 604. Other types of identifiers may also be used.

Security functions may be performed after step 604 between the mobile station MS and the serving GPRS support node SGSN. The SGSN sends 605 a PDP context creation request to the GGSN. The GGSN receives request 605 and determines the appropriate P-CSCF on the basis of the authorization token.

The GGSN requests 606 authorization for allocating resources for the activation of the session indicated by the flow identifier from the P-CSCF. When the PCF of the P-CSCF finds the IP flow information corresponding to request 606, it makes the final decision about allocating resources to the session and replies 607 to the GGSN. The response includes an authorization token, a packet classifier having one or more data flow identifiers negotiated on the application plane and intended as the filter, and other information specified for the Go interface between the CSCF and the GGSN in 3GPP specification 3GPP TS 23.207, v. 5.2.0 'End-to-End QoS Concept and Architecture; Release 5'. The advantage of this embodiment is that no changes are needed in the Go interface; only the GGSN has to perform the binding to the secondary PDP context.

The GGSN responds 608 to the decision message 607. The PEP function of the GGSN generates a 'gate', which implements access control according to the decision of the PCF on a data flow according to the flow identifier using packet classification parameters. The gate and thereby the packet classifier are bound 609 to the secondary PDP context being activated based on the identifier distinguishing it from other secondary PDP contexts. The GGSN thus preferably maintains binding information, packet classifier and at least one identifier identifying the PDP context for each data flow to be mapped. Other information received from the Go interface may also be stored at the gateway GPRS support node GGSN. The GGSN checks, based on the quality of service information received from the PCF, that the quality of service requested for the PDP context does not exceed the quality of service negotiated on the application plane and authorized by the PCF. The GGSN creates a new context in the PDP context table but does not, however, take the TFT filter functionality into use, since the received TFT information element does not include filter parameters.

The GGSN then sends a response 610 to the SGSN. The SGSN may initiate the establishment of a radio network service, whereby a radio access bearer is set up 611 for the mobile station MS. If the requested QoS attributes cannot be provided for instance on the basis of the subscriber contract, the SGSN informs this to the gateway GPRS support node GGSN, which confirms new QoS attributes. The SGSN sets the packet flow identifier and the radio priority in accordance with the negotiated QoS and responds 612 to the mobile station MS. The mobile station MS updates its context information with the new PDP context. The MS is now able to send and receive data packets of the logical connection negotiated on the application plane and use the PDP context. After step 612, the application of the mobile station or the entity reserving quality of service for it is still able to send necessary messages to finally activate the end-to-end session. For example, an application using the RSVP protocol may send and receive RSVP path and RSVP response messages, based on which also the PDP context, the radio access channel and the PEP gate functionality can be updated.

When the GGSN receives 613 a downlink packet, it checks 614 the packet classifiers, i.e. determines if the packet can be admitted to the GPRS network based on any packet classifier. If a packet classifier is found to whose filter parameters the packet identifiers correspond, the packet is sent 615 to the mobile station MS using the PDP context bound to the packet classifier and the GTP tunnel defined in the PDP context.

FIG. 6 illustrates the activation of a secondary PDP context. Based on the above, the present filtering and mapping functionality can also be applied to other PDP context activation situations and generally in modification steps of active PDP contexts. If different PDP contexts have different PDP addresses, it is sufficient that the PEP function has bound the packet filter PF to a PDP address indicating the GTP tunnel to which the packets are to be sent. The method illustrated above can be applied to arranging both mobile-originated and mobile-terminated application-plane logical connections. When a PDP context is removed or an-application-plane logical connection is released, the binding between the packet classifier and the PDP context can be removed from the PEP function.

The invention can be implemented in a mobile station and in network elements (in accordance with an embodiment, in the gateway GPRS support node GGSN) as computer software executed in one or more processors. Hardware solutions or a combination of software and hardware solutions may also be used.

It is obvious to a person skilled in the art that as technology advances, the basic idea of the invention can be implemented in a variety of ways. The invention and its embodiments are thus not limited to the above examples, but may vary within the claims.

The invention claimed is:

1. A method comprising:
    receiving one or more identifiers identifying a data flow of a first subsystem from a signalling element to a network node for transmitting packet data from the first subsystem to a terminal in the second subsystem,
    generating at least one filter for directing a mapping of at least one data flow of the first subsystem to at least one data flow of the second subsystem, characteristics of said filter being determined at least on the basis of the one or more identifiers received at least in the network node,
    associating said filter, having the characteristics determined at least on the basis of the one or more identifiers received from the signalling element, to at least one data flow of the second subsystem, and
    mapping at least one data flow of the first subsystem to at least one data flow of the second subsystem based on the characteristics of said filter, said filter being bound to a packet data protocol context of the second subsystem, a packet data protocol context activation request with a traffic flow template information element without filter information being received from the terminal in response to the need to create a packet data protocol context.

2. A method as claimed in claim 1, wherein the identifiers identifying the data flow on the application plane are negotiated at the element participating in the application-plane negotiation,
    the identifiers identifying the data flow are transmitted to the network node in the second subsystem, and said filter is generated at the network node from the identifiers identifying the data flow and transmitted by said element managing the session.

3. A method as claimed in claim 1, wherein the transmission of a packet received at the network node to the terminal is prevented in response to the identifiers of the received packet not being defined in any filter specified for the terminal.

4. A method as claimed in claim 1, wherein an identifier is specified for at least one data flow of said second subsystem for distinguishing it individually from the data flows employing the same address of the terminal in response to the ability to transfer data to the address of the terminal in the second system via at least two data flows, and said identifier is bound to said filter.

5. A method as claimed in claim 1, wherein said filter is bound to at least one packet data protocol context in a policy enforcement point function of a gateway general packet radio service support node supporting an Internet protocol multimedia subsystem, the policy enforcement point function is configured to map at least one data flow of the first subsystem to at least one packet data protocol context in the second subsystem.

6. A network element, wherein said network element is configured to receive one or more identifiers identifying a data flow of a first subsystem from a separate signalling element, said network element is configured to generate at least one filter for directing a mapping of at least one data flow of the first subsystem to at least one data flow of a second subsystem at least on the basis of the one or more identifiers, said network element is configured to associate said filter, generated at least on the basis of the one or more identifiers received from the signalling element, to at least one data flow of the second subsystem, said network element being configured to associate said filter to a packet data protocol context of the second subsystem, said network element is operative with a traffic flow template information element without filter information received in a packet data protocol context activation request in response to a need to create a packet data protocol context, and said network element is configured to map at least one data flow of the first subsystem to at least one data flow of the second subsystem based on said filter.

7. A wireless terminal, the wireless terminal being configured to transmit a configuration signal to a network node in a mobile system for activating or modifying a packet data protocol context for linking a packet radio network to an external system, wherein the wireless terminal is configured to check if a filter used for mapping data flows at the network node is determined by a separate network element, wherein the wireless terminal is configured to generate said configuration signal without filter information in response to the filter associated to a packet data protocol context of the packet radio network and used for mapping the data flows being determined in the separate network element and being sent to the network node by the separate network element, wherein the wireless terminal is configured to transmit, in a packet data protocol context activation request, a traffic flow template information element in response to the need to create a packet data protocol context.

8. A wireless terminal according to claim 7, wherein the packet radio network is a general packet radio service network or a universal mobile telecommunications system network offering packet-switched service.

9. An apparatus comprising a processor configured to cause the apparatus to:

receive one or more identifiers identifying a data flow of a first subsystem from a separate signalling element, generate at least one filter for directing a mapping of at least one data flow of the first subsystem to at least one data flow of a second subsystem at least on the basis of the one or more identifiers received from the signalling element, associate said filter, generated at least on the basis of the one or more identifiers received from the signalling element, to at least one data flow of the second subsystem, receive from the terminal a traffic flow template not including any filtering parameters, and map at least one data flow of the first subsystem to at least one data flow of the second subsystem based on said filter; and wherein the filter is bound to at least one packet data protocol context in a policy enforcement point function of a gateway general packet radio service support node supporting an Internet protocol multimedia sub-system, and the policy enforcement point function is configured to map at least one data flow of the first subsystem to at least one packet data protocol context in the second subsystem.

10. An apparatus comprising a processor configured to cause the apparatus to:

transmit a configuration message to a network node for activating or modifying a logical connection for data transfer between the apparatus and an external system, check if a filter for mapping data flows at the network node is determined by a separate network element, and generate said configuration message without filter information in response to the filter for mapping the data flows being determined by the separate network element and being sent to the network node by the separate network element;

transmit in a packet data protocol context activation request a traffic flow template information element without filter information in response to a need for creating a packet data protocol context; and transmit the packet data protocol context activation request comprising the traffic flow template information element without filter information in response to detecting that the packet data protocol context is to be activated for a service-based local protocol.

11. The apparatus of claim 10, wherein the processor is configured to transmit said configuration message to a general packet radio service network or a universal mobile telecommunications system network offering packet-switched service.

12. A method comprising:

checking if a filter for mapping data flows at a network node is determined by a separate network element, and generating a configuration message, for activating or modifying a logical connection for data transfer between the apparatus and an external system, without filter information in response to the filter for mapping the data flows being determined by the separate network element and being sent to the network node by the separate network element, and transmitting the configuration message to the network node;

wherein a packet data protocol context activation request comprising a transmit flow template information element without filter information is transmitted in response to a need for creating a packet data protocol context; and wherein the packet data protocol context activation request comprising the traffic flow template information element without filter information is transmitted in response to detecting that the packet data protocol context is to be activated for a service-based local protocol.

13. The method of claim 12, wherein the configuration message is transmitted to a general packet radio service network or a universal mobile telecommunications system network offering packet-switched service.

* * * * *

UNITED STATES PATENT AND TRADEMARK OFFICE
CERTIFICATE OF CORRECTION

PATENT NO. : 7,643,456 B2  Page 1 of 1
APPLICATION NO. : 10/957777
DATED : January 5, 2010
INVENTOR(S) : Jouppi et al.

It is certified that error appears in the above-identified patent and that said Letters Patent is hereby corrected as shown below:

Column 12, line 36 delete after "element" delete "and".
Column 12, line 65 delete "element, and" and insert --element;-- therefor.

Signed and Sealed this

Twenty-ninth Day of June, 2010

David J. Kappos
*Director of the United States Patent and Trademark Office*